2,999,049
WARFARIN SODIUM AND HEPARIN SODIUM COMPOSITION

Karl Paul Link, Middleton, Wis., assignor to Wisconsin Alumni Research Foundation, Madison, Wis., a corporation of Wisconsin
No Drawing. Filed Mar. 27, 1959, Ser. No. 802,300
3 Claims. (Cl. 167—65)

The present invention relates to the anticoagulant field and more specifically to a new and improved anticoagulant composition for use in the clinical field.

The use of heparin as heparin sodium as an anticoagulant in the clinical field is well known (United States Pharmacopeia, 15th edition, pages 317–318 (1955), U.S. Dispensatory, 25th edition, pages 635–640). It is a family of active principles, having the property of prolonging the clotting time of blood in man or other animals and is administered parenterally in the form of its sodium salt in aqueous solution usually by intravenous injection. The action of heparin is rapid but relatively short in duration, e.g. 4–6 hours depending on dosage. Aside from its limited duration of effect, which requires frequent injection by trained personnel (it is inactive orally), it has the additional disadvantage of being high in cost.

The use of the sodium salt of the widely used rodenticide, warfarin, 3-($\alpha$-acetonylbenzyl)-4-hydroxycoumarin (see Link, K. P., and Ross, Ward, Pest Control, August 1956), as an anticoagulant in the clinical field has more recently been proposed and is now also well known. See the New York Heart Association (New York Academy of Medicine) lecture entitled "The Discovery of Dicumarol and Its Sequels," of February 25, 1958, by Karl Paul Link, Circulation 19 No. 1, pp. 97–107 (1959). See also Pollock, B. E., J.A.M.A. 161, 404 (1956), and Shapiro et al., J.A.M.A. 165, 1377 (1957), and the other 16 citations in "Warfarin Sodium in Human Medicine," prepared for Poison Control Centers, by Wisconsin Alumni Research Foundation (1958). It is widely available as warfarin-sodium under the trademark "Coumadin, Sodium." Unlike heparin, the action of warfarin sodium is not immediate but is relatively long in duration. The latent period, for example, is about 8–12 hours with duration of anticoagulant effect up to about 3 to 6 days depending on the dosage. Warfarin sodium can be administered orally like Dicumarol [3,3'-methylenebis-(4-hydroxycoumarin)], but, unlike Dicumarol, can also be administered in aqueous solution form by intravenous or intramuscular injection. Indeed, until the discovery and development of warfarin sodium, no clinically useful anticoagulant was available that could be administered by both routes and no clinically long acting anticoagulant was available that could be administered by the intravenous route. See Link, K. P., lecture, supra. For this and other reasons, warfarin sodium has been called the "more nearly ideal anticoagulant drug" now available (Nicholson, J. H., New England Jl. of Medicine 255, 491 (1956)). See also Baer, S., J.A.M.A. 167, 704, June 1958.

Blood coagulation involves at least two stages which can be illustrated as follows:

First phase

Prothrombin+Ca+thromboplastin→thrombin

Second phase

Thrombin+fibrinogen→fibrin clot

The modes of action of the anticoagulants heparin and warfarin sodium are not the same. It is generally agreed that heparin interferes in the first phase of blood coagulation, preventing the transformation into thrombin, or "neutralizes" thrombin when and if formed. See New and Non-Official Drugs, page 421 (1958).

Warfarin sodium, like other 4-hydroxycoumarin anticoagulants such as Dicumarol, acts by depressing "prothrombin formation" in the liver and thus retards the clotting of the blood. The "prothrombin" depression is measured by extension of the "prothrombin clotting time" of plasma. See Link, K. P., lecture, supra. Unlike the effect of heparin, the action of warfarin sodium is readily reversible by administration of vitamin K compounds.

Due to the immediate action of heparin its administration is generally indicated at the recognition of the thromboembolic disorder (e.g. myocardial infarction, pulmonary embolism etc.). The administration of warfarin sodium follows. The administration of the latter for the control or prophylaxis of further thromboembolic incidents (i.e. prevention of the formation of additional intravascular clots) may continue for an extended period. Wright, I. S., et al., Myocardial Infarction (report of Committee on Anticoagulants), published for The American Heart Association, Grune & Stratton, New York City (1954). Heparin due to its immediate action is obviously a valuable clinical tool for rapidly initiating the treatment to prevent or inhibit further intravascular clotting. It is also obvious that the change to an anticoagulant whose action is prolonged, easily controlled and reversible by vitamin K (specifically $K_1$), should be made as soon as medically indicated. Economically the change is also indicated as an average dose of the short acting heparin costs at least about five times that of an average dose of the longer acting warfarin sodium.

Experience has shown that the separate parenteral administration of two drugs is both bothersome and inconvenient from the point of view of the patient and the trained personnel making the injections. This is particularly true when the patient has recently had a thromboembolic experience (e.g. when still in shock) and it is necessary to locate a vein for intravenous injections. Attempts to solve this problem in the past by the single injection of a solution of heparin sodium and the di-sodium salt of 3,3'-methylenebis(4-hydroxycoumarin), i.e. Dicumarol, failed due to the difficulty of preparing solutions of Dicumarol and the instability of such solutions. [See Overman et al., and Link, K. P., J. Bio. Chem., 142, 948 (footnote 5), 1942]. The solutions containing heparin sodium and the di-sodium salt of Dicumarol proved to be impractical. At the high pH required to keep the Dicumarol in solution as the disodium salt, both Dicumarol and heparin are unstable.

Instead of separate administrations of heparin sodium and then warfarin sodium, as practiced now, it would thus be advantageous, if possible, to initiate treatment by a single intravenous administration of the mixture. The modus operandi being that the heparin would promptly provide the rapid anticoagulant action desired and that the warfarin sodium would take over and continue the action desired as the activity of the heparin dropped off. Aside from the question of timing involved a single injection would not be possible unless the heparin and warfarin sodium were physically and chemically compatible.

The stability of the herparin sodium-warfarin sodium combination had to be resolved. It was found, for example, that when the commercially available heparin sodium was mixed with the commercially available warfarin sodium, and the resulting mixture then dissolved in distilled water, that precipitates formed on standing making the solution unsuitable.. This problem could be avoided in part by preparing separate fresh solutions and mixing them just prior to injection, but this procedure, aside from the manipulations involved in preparing and mixing fresh solutions just prior to administration to provide proper dosage of each ingredient and at the same time attempting to maintain the necessary sterile conditions, also proved objectionable as pH adjustment was frequently required to put or hold the warfarin sodium in solution. The solution of the problem thus called for providing the medical profession with a single, stable, mixture of heparin sodium and warfarin sodium in dosage unit form readily adaptable for administration. A combination dosage unit of this type has a distinct advantage in that it provides greater assurance of sterile preparation.

The following examples will serve to illustrate the solution of this problem as provided by the present invention.

Example I

|                                            | Grams |
|--------------------------------------------|-------|
| Warfarin, sodium                           | 50    |
| Heparin, sodium                            | 100   |
| Sodium chloride                            | 15    |
| Fresh boiled and cooled distilled water, q.s. 1000 cc. |       |

The warfarin sodium is first added to the water with stirring to dissolve, followed by the heparin sodium with stirring to dissolve. The pH of the resulting solution is next adjusted with a few drops of 1 N NaOH to pH 10. The sodium chloride is then added with stirring and the resulting isotonic solution filtered to insure the absence of any insoluble material. The filtered solution is assayed and, if necessary, adjusted for heparin sodium and warfarin sodium content, and then sterilized by filtration in accordance with standard practices in the art. Vials, e.g. 3 cc. vials, are then filled with one cc. of the sterilized solution and the solution lyophilized in the vials. This can be readily done by placing the vials in a deepfreeze for about 24 hours and then freeze drying the resulting frozen material in the vials for about 48 hours with the vacuum pump operating continuously. The vials, with the dried material, each containing 50 mg. of warfarin sodium and 100 mg. of heparin sodium are then aseptically stoppered. The resulting dry mixture is stable and can readily be prepared in solution form for injection by adding 3 cc. of distilled water to the vial. The pH of the resulting solution apparently due in part to $CO_2$ uptake is about 7.7–7.8. In a similar manner stable dosage units can be prepared containing 25–100 mg. or more of heparin sodium and 10–100 mg. or more of warfarin sodium. The distilled water used to dissolve the dried mixtures can be conveniently supplied in ampules with the desired amounts for injection.

Example II

This example is in accordance with Example I down to and including filtration of the isotonic solution to remove any insoluble material. Distilled water (2000 cc.) is then added and the pH of the resulting solution is adjusted, if necessary, with $CO_2$, HCl or the like to about neutral, e.g. pH 7–7.5. (pH adjustment may not be required due to the presence of $CO_2$ in the distilled water). The neutral solution is then allowed to stand for about 2–6 days at room temperature or below with about 3–4 days being preferred. The solution is next assayed and, if necessary, adjusted for heparin sodium and warfarin sodium content. The solution is then filtered to remove any insoluble material (including any precipitate that may have formed during standing), sterilized by filtration and 3 cc. of the sterile solution placed in ampules or vials in accordance with standard practices in the art. The sodium chloride can be replaced by equivalent materials to provide for the isotonicity of the solution and small amounts of a pharmaceutically acceptable preservative can also be used as desired.

The warfarin sodium used in the above examples should be of the highest quality with an alkaline color value, expressed in optical density, not exceeding 0.1. This value can be ascertained by dissolving 1.25 g. of warfarin sodium in 10 ml. of 5% NaOH and within 15 minutes determining the optical density in a one cm. cuvette at 385 m$\mu$, using 5% NaOH as the blank. The alkaline color value is due in a small measure to warfarin sodium and in a large measure to an undetermined by-product or products, possibly one or more phenolic ketones such as 3-(o-hydroxyphenyl)-5-phenyl-2-cyclohexene-1 one which has been identified in warfarin sodium precipitates. When the alkaline color value (optical density determined as above) of the warfarin sodium does not exceed 0.1, there is little tendency for the formation of precipitates in the heparin sodium-warfarin sodium solution.

Warfarin sodium with the desired alkaline color value for use in the present invention can be prepared from purified (recrystallized) warfarin with care in accordance with the process described in Link Patent No. 2,777,859. Preferably, it is prepared by a modified process in which the excess warfarin is slurried in an aqueous acetone mixture before addition of the aqueous NaOH and the product after drying is recrystallized from isopropanol, as described in the copending application of Link and Schroeder, entitled "Improvements in the Art and Science of Making Warfarin Sodium," Serial No. 795,356, filed February 25, 1959. Solutions prepared as described in the above examples with warfarin sodium having the specified alkaline color value have been demonstrated by chemical and biological tests to be compatible.

The warfarin sodium used in the present invention must be substantially free from the two known classes of heparin antagonists, namely, basic substances which bind heparin and thus annul the heparin effect, and phenolic and ketonic bodies which counteract the heparin co-factor of plasma. Warfarin is made by the condensation of benzalacetone with 4-hydroxycoumarin. Since benzalacetone is known to be irritating to membranes and has been found to react with heparin if the heparin has any free functional groups, it is also especially important that the warfarin sodium be substantially free from benzalacetone. The heparin sodium used in the present invention also should be of the highest purity, e.g. U.S.P. 110 units/mg., and preferably above U.S.P. standards, e.g. 120–135 units/mg. It is particularly important that the U.S.P. trichloroacetic acid protein precipitation test be negative.

The lyophilized composition of Example I of the present invention may contain 0.5 up to 1 percent moisture. To help in the removal of the moisture it is desirable to add a small amount, e.g. about 0.5–1.0 cc., of absolute ethanol to the lyophilized material in the vials and repeat the lyophilizing to remove the alcohol along with water. For overall stability during long periods of storage a solid product substantially free from moisture is preferred.

The stable herparin sodium-warfarin sodium dosage units of the present invention can be used to advantage, as noted above, in initiating treatment in thromboembolic disorders. Treatment then can be advantageously continued solely with the relatively inexpensive warfarin sodium as described in the clinical publications noted above.

The warfarin sodium-heparin sodium is a unique combination. The sodium salt of Dicumarol, as noted, above, tends to be unstable at the pH required to keep the salt in solution. The sodium salts of other anticoagulants such as Marcumar (3-[1'-phenylpropyl]-4-hydroxycoumarin) and Danilone (2-phenyl-1,3-indanedione) form solutions with low orders of stability. The sodium salt of another anticoagulant "Tromexan" (3,3'-carboxymethylene-bis-[4-hydroxycoumarin]) is not known. At the present time, the warfarin sodium-heparin sodium composition of the present invention is believed to be the only combination consisting of both a rapid and a prolonged acting anticoagulant stable at pH values within the physiological range.

I claim:
1. A new composition of matter in dosage unit form consisting essentially of 10–100 mg. of warfarin sodium and 25–100 mg. of heparin sodium, said warfarin sodium being characterized by an alkaline color value, expressed in optical density, not exceeding 0.1 and being further characterized by being substantially free from (a) basic substances which bind heparin and annul the heparin effect and (b) phenolic and ketone bodies which counteract the heparin co-factor of plasma, and said heparin sodium being characterized by having at least 110 U.S.P. units/mg. and by having a negative U.S.P. trichloroacetic acid protein precipitation test.

2. A composition in accordance with claim 1 containing about 50 mg. of warfarin sodium and about 100 mg. of heparin sodium and where the heparin sodium has about 120–135 U.S.P. units/mg.

3. The process of preparing a composition in accordance with claim 1 which comprises dissolving the warfarin sodium and heparin sodium in distilled water, adjusting the pH of the resulting solution to about 10, adding sodium chloride to make the solution isotonic, filtering to remove any insoluble material and then lyophilizing the resulting solution in the prescribed dosage units.

References Cited in the file of this patent

UNITED STATES PATENTS 2,777,859     Link _____ Jan. 15, 1957

OTHER REFERENCES

Kuizeno: J. Biol. Chem., June 1943, vol. 148, pp. 641–647.

Science, vol. 127, Jan. 24, 1958, p. 188.